United States Patent
Larsen et al.

(10) Patent No.: US 9,203,333 B2
(45) Date of Patent: Dec. 1, 2015

(54) SYSTEM AND METHOD FOR VOLTAGE CONTROL OF WIND GENERATORS

(71) Applicant: General Electric Company, Schenectady, NY (US)

(72) Inventors: Einar Vaughn Larsen, Ballston Lake, NY (US); Alfredo Sebastian Achilles, Buenos Aires (AR)

(73) Assignee: General Electric Company, Schenectady, NY (US)

( * ) Notice: Subject to any disclaimer, the term of this patent is extended or adjusted under 35 U.S.C. 154(b) by 93 days.

(21) Appl. No.: 14/018,478

(22) Filed: Sep. 5, 2013

(65) Prior Publication Data

US 2015/0061289 A1 Mar. 5, 2015

(51) Int. Cl.
| | |
|---|---|
| F03D 9/00 | (2006.01) |
| H02P 9/04 | (2006.01) |
| F03D 7/00 | (2006.01) |
| F03D 7/02 | (2006.01) |
| F03D 7/04 | (2006.01) |
| H02J 1/00 | (2006.01) |
| H02P 101/15 | (2015.01) |

(52) U.S. Cl.
CPC .. *H02P 9/04* (2013.01); *F03D 7/00* (2013.01); *F03D 7/0272* (2013.01); *F03D 7/048* (2013.01); *H02J 1/00* (2013.01); *H02P 2101/15* (2015.01)

(58) Field of Classification Search
USPC .............................. 290/44, 55; 700/286, 287
See application file for complete search history.

(56) References Cited

U.S. PATENT DOCUMENTS

| | | | |
|---|---|---|---|
| 7,119,452 B2 * | 10/2006 | Larsen | ............................ 290/55 |
| 7,166,928 B2 | 1/2007 | Larsen | |
| 7,224,081 B2 | 5/2007 | Larsen | |
| 2010/0109447 A1 * | 5/2010 | Achilles et al. | ............... 307/153 |
| 2010/0268393 A1 * | 10/2010 | Fischle et al. | .................. 700/287 |

FOREIGN PATENT DOCUMENTS

| | | | | |
|---|---|---|---|---|
| DE | 102011112025 A1 | 2/2013 | | |
| EP | 1933441 A1 * | 6/2008 | ................ | H02J 3/06 |
| EP | 2175540 A2 * | 4/2010 | ................ | H02J 3/38 |
| WO | 2010085987 A2 | 8/2010 | | |

OTHER PUBLICATIONS

Ledesma et al., "Contribution of variable-speed wind turbines to voltage control", Wind Engineering. Multi-Science Publishing Co., vol. No. 26, Issue No. 6, pp. 347-358, Nov. 30, 2002.
European Search Report and Written Opinion issued in connection with related EP Application No. 14181594.4 dated Jan. 29, 2015.
A Denmark Office Action issued in connection with corresponding DK Application No. PA201470526 on Mar. 27, 2015.

* cited by examiner

*Primary Examiner* — Julio Gonzalez Ramirez
(74) *Attorney, Agent, or Firm* — Dority & Manning, P.A.

(57) ABSTRACT

A method for reactive power generation for a wind turbine generator includes receiving a voltage command signal, and adjusting this voltage command signal as a function of the wind turbine reactive power. A reactive current is determined for the wind turbine generator in response to the adjusted voltage command signal and is transmitted to a controller of the wind turbine generator for generating a real and reactive power based on the reactive current command.

8 Claims, 3 Drawing Sheets

US 9,203,333 B2

SYSTEM AND METHOD FOR VOLTAGE CONTROL OF WIND GENERATORS

FIELD OF THE INVENTION

The present invention relates generally to the field of wind turbines, and more particularly to voltage control systems and techniques for use with wind turbine generators having continuous control of reactive power for at least part of the reactive power compensation function.

BACKGROUND OF THE INVENTION

Wind power generation is typically provided by a wind "farm" of a large number (often 100 or more) wind turbine generators. Individual wind turbine generators can provide important benefits to power system operation related to mitigation of voltage flicker caused by wind gusts and mitigation of voltage deviations caused by external events.

In a wind farm setting, each wind turbine generator can experience a unique wind force. Therefore, each wind turbine generator typically includes a local controller to control the response to wind gusts and other external events. Prior art wind farm control has generally been based on one of two architectures: local control with constant power factor or reactive power and farm-level control in voltage control, or local control in constant voltage control with no farm-level control.

Local control with constant power factor and farm-level control in voltage control requires fast communications with aggressive action from the farm-level to the local level. If the farm-level control is inactive the local control can aggravate voltage flicker. With constant voltage control on each generator, steady-state operation varies significantly with small deviations in loading on the transmission grid. This causes the wind turbine generators to encounter limits in steady-state operation that prevent a response to disturbances-resulting in a loss of voltage regulation. Because reactive current is higher than necessary during this mode of operation, overall efficiency of the wind turbine generator decreases.

U.S. Pat. No. 7,224,081 describes a voltage control method and system for wind turbines wherein a reactive power regulator controls reactive power production of individual wind turbines in a wind farm by adjusting the voltage setpoint to a voltage regulator. This scheme relies on receipt of a reactive power command to each wind turbine generator. At the individual wind turbine level, a fast voltage regulator holds the wind turbine low-voltage side to a setpoint, which is adjusted by the reactive power regulator to follow the command from the wind farm control. The reactive power regulator has a first time constant that is numerically greater than a time constant of the voltage regulator. This control scheme is beneficial in that it forces all wind turbines within the wind farm to have the same reactive power output. Also, if the wind farm-level control is off, then the wind turbines all stay at a preset reactive power output even if the grid voltage varies. A downside to this scheme, however, is that the wind farm controller must act through the time constant of the reactive power regulator.

BRIEF DESCRIPTION OF THE INVENTION

Aspects and advantages of the invention will be set forth in part in the following description, or may be obvious from the description, or may be learned through practice of the invention.

A particular method embodiment for reactive power generation for a wind turbine generator includes receiving a voltage command signal from a higher-than-generator-level, such as a wind farm or substation, controller. In this description, the term "field-level" is generically meant to include all such higher-than-generator-level configurations, such as a substation of multiple wind turbines, a wind farm of multiple substations or multiple wind turbines, and so forth. The voltage command signal is adjusted for each wind turbine as a function of the wind turbine's actual reactive power. A reactive current command is generated for the wind turbine generator in response to the adjusted voltage command signal. The reactive current command is transmitted to a converter controller of the wind turbine generator for generating a reactive power based on the reactive current command.

In a particular embodiment, a voltage trim value is generated as a function of the wind turbine's reactive power, for example with a reactive power regulator, and is applied to the voltage command to generate the adjusted voltage command signal. In certain embodiments, the adjusted voltage command signal is limited to a range of upper and lower limits based on generator terminal voltage, and the reactive current command is limited to a range based on a current rating of the wind turbine generator.

The adjusted voltage command signal may be compared to a measured terminal voltage of the wind turbine generator to generate an error voltage signal that is transmitted as an input or setpoint value to a voltage regulator.

In a particular embodiment, the voltage command signal is a field-level signal applicable to all or a subset of wind turbines within a wind farm or substation.

In certain embodiments, a reactive power feedback signal from the wind turbine generator and a reference reactive power signal are transmitted to the reactive power regulator for generation of the voltage trim value. The delta voltage trim value may be limited by the reactive power regulator.

The reference reactive power signal may be generated in various ways. For example, a field-level reactive power signal may be generated that is indicative of average reactive power of all or a subset of wind turbines within a wind farm or substation. This signal may be generated by a field-level controller that receives measured reactive current from all or a subset of wind turbine generators within the wind farm or substation and computes an average reactive power signal therefrom. In an alternate embodiment, the field-level reactive power signal is generated by a field-level controller that measures total reactive current at the field level and determines an estimated average reactive power signal for individual wind turbines therefrom.

An alternate method for reactive power generation for a wind turbine generator includes receiving a voltage command for a wind turbine generator from a field-level controller, and receiving a reference reactive power signal and a feedback reactive power signal for the individual wind turbine. A voltage trim value is generated from the reference reactive power signal and the feedback reactive power signal and is limited to a predetermined voltage range. The delta voltage trim value is applied to the voltage command to generate an adjusted voltage command signal, which is limited to a predetermined voltage range. A voltage error signal is generated based on a measured voltage of the individual wind turbine generator and the adjusted voltage command. A current command is generated based on the voltage error signal, and is limited to a predetermined current range.

In a particular embodiment, the voltage trim value is generated by a reactive power regulator in the wind turbine generator, and the current command is generated by a voltage regulator in the wind turbine generator, wherein the reactive power regulator has a controller with a time constant that is greater than a time constant of the voltage regulator controller. For example, the reactive power regulator may have a proportional integral (PI) controller having a closed loop response equivalent to a time constant in the range of 1 to 10 seconds, and the voltage regulator may have a proportional integral (PI) controller having a closed loop response equivalent to a time constant of less than 1 second.

The field-level controller may be variously configured. In certain embodiments, the field-level controller includes a voltage regulator with inputs of (a) plant level voltage and (b) reactive power output from individual turbines, and outputs of (a) voltage command and (b) reactive power command.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which.

DETAILED DESCRIPTION OF THE INVENTION

Figure 1:
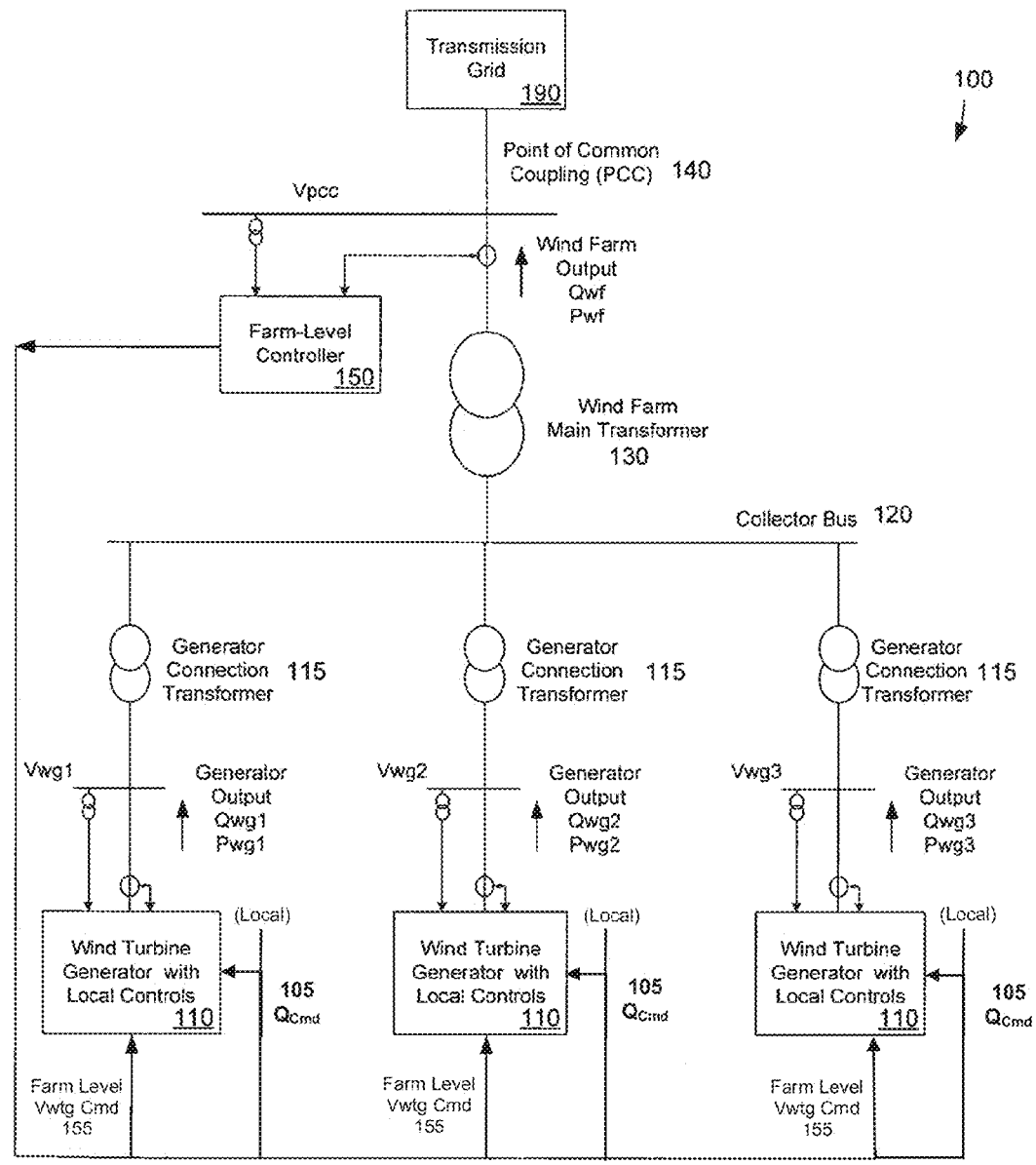
FIG. 1 is a block diagram of a wind farm having multiple wind turbine generators coupled with a transmission grid.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

A wind turbine generator control system in accordance with aspects of the invention is based on sending a reference voltage command to all of the wind turbines within a wind farm or substation rather than a reactive power command, as is done in the prior art. For grids requiring stabilization, this control scheme is advantageous since the voltage reference modification affects wind turbine operation faster. The reference voltage control scheme is implemented with relatively fast regulation of voltage for individual generators at the generator terminals or at a synthesized remote point (e.g., between the generator terminals and the collector bus). A relatively slow reactive power regulator adjusts the set point of the relatively fast voltage regulator as a function of the reference reactive power command received from the wind field controller and the reactive power feedback. The voltage trim signal is thus used to adjust the voltage setpoint of a relatively fast voltage regulator that generates the reactive current command for the turbine generator.

It should be appreciated that the reference voltage command signal may be generated by any field-level (i.e., higher-than-generator-level) controller, such as a substation controller or a wind farm-level controller. For description purposes, embodiments are described herein with respect to a wind farm wherein a plurality of wind turbines are in communication with a wind farm-level controller.

FIG. 1 is a block diagram of a wind farm 100 having multiple wind turbine generators coupled with a transmission grid. FIG. 1 illustrates only three wind generators; however, any number of wind generators can be included in a wind farm.

Each wind turbine generator 110 includes a local controller that is responsive to the conditions of the wind turbine generator being controlled. In one embodiment, the controller for each wind turbine generator senses only the terminal voltage and current (via potential and current transformers). The sensed voltage and current are used by the local controller to provide an appropriate response to cause the wind turbine generator to provide the desired reactive power and voltage. A control system diagram corresponding to one embodiment of a wind turbine generator controller is described in greater detail below with respect to FIG. 2.

Each wind turbine generator 110 is coupled to collector bus 120 through generator connection transformers 115 to provide real and reactive power (labeled $P_{wg}$ and $Q_{wg}$, respectively) to collector bus 120. Generator connection transformers and collector buses are known in the art.

Wind farm 100 provides real and reactive power output (labeled $P_{wf}$ and $Q_{wf}$, respectively) via wind farm main transformer 130. Farm-level controller 150 senses the wind farm output, as well as the voltage at the point of common coupling (PCC) 140, to provide a farm-level wind generator terminal voltage command (Farm-Level $V_{wtg\ cmd}$) 155. In one embodiment, the farm-level controller 150 provides a single $V_{wtg\ Cmd}$ signal 155 to all wind turbine generators in the wind farm 100. In alternate embodiments, the farm-level controller 150 may provide multiple commands for subsets of wind turbine generators of the wind farm 100. The commands to subsets of wind turbine generators can be based on, for example, a farm-level voltage regulator.

Still referring to FIG. 1, the local controller of each wind turbine generator 110 may also be provided with a Q command signal 105 ($Q_{Cmd}$) from the farm-level controller that indicates desired reactive power at the generator terminals to ensure a reasonable distribution of reactive power among the wind turbines. In alternate embodiments, this Q command signal ($Q_{Cmd}$) 105 may be generated as the local or operator level (indicated by the "Local" line in FIG. 1), for example in the event that the wind turbine generator is in manual mode or otherwise not in communication with the wind farm controller 150, as explained in greater detail below.

Figure 2:
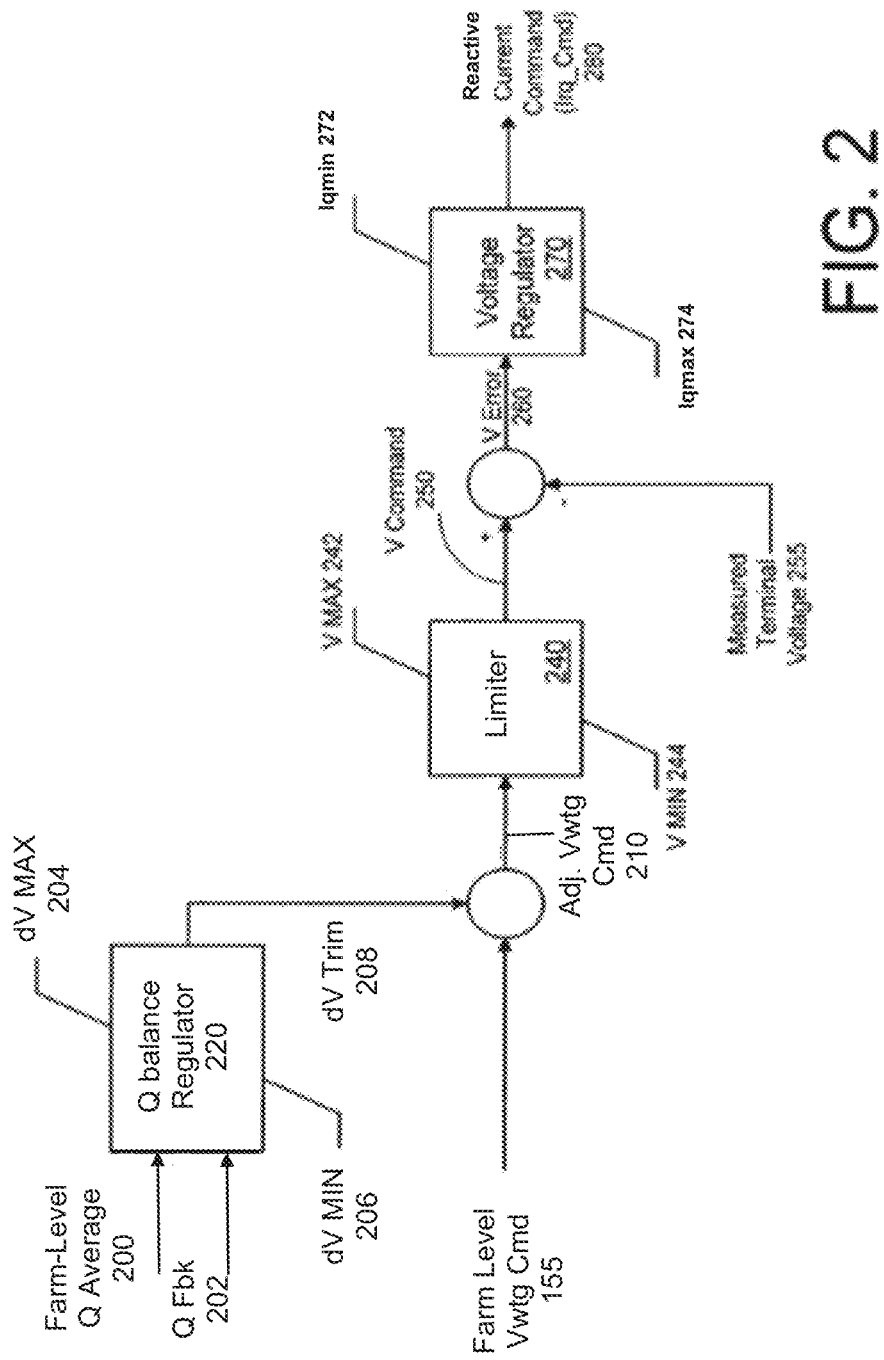
FIG. 2 is a control diagram of one embodiment of a wind turbine generator control system.

The control system of FIG. 2 provides an improved control structure involving both turbine and farm-level control that can perform a robust farm-level voltage control performance with uniform reactive power output of the wind turbines.

Referring to the wind turbine control system diagram of the embodiment of FIG. 2, the control system generally includes two loops: a voltage regulator loop and a reactive (Q) balance regulator loop. The voltage regulator loop operates relatively fast (e.g., 20 rad/sec) as compared to the Q balance regulator loop (e.g., generally slower than 1 second closed loop time constant). The Q balance regulator adjusts the set point of the voltage regulator, as described below.

Conceptually, the control system of FIG. 2 provides for wind turbine generator terminal voltage control by regulating the voltage according to a reference set by a higher-than-generator-level (e.g., substation or wind farm) controller. In the present case, this higher reference is the farm-level $V_{wtg\ Cmd}$ signal 155. Reactive power is regulated over a longer term (e.g., several seconds) to evenly distribute reactive power among wind turbines while wind turbine generator terminal voltage is regulated over a shorter term (e.g., less than several seconds) to mitigate the effects of fast grid transients.

Referring still to the wind turbine controller embodiment of FIG. 2, the Q balance regulator 220 receives the average turbine reactive power output signal 200 ($Q_{Avg}$) indicative of the average reactive power output from all of the wind turbines 110. This signal $Q_{Avg}$ 200 can be generated in various ways. In one embodiment, measured reactive current from each wind turbine 110 is sent to the wind farm controller 150, which computes an average and transmits the signal $Q_{Avg}$ 200 to each wind turbine 110. In another embodiment, total reactive power may be sensed at the wind farm-level, which is used by the wind farm controller 150 to determine an approximate average based on the number of wind turbines 110, with this approximate average being transmitted as signal $Q_{Avg}$ zoo to the individual wind turbines 110.

The Q balance regulator 220 also receives a feedback Q value ($Q_{Fbk}$) signal 202 indicative of the individual wind turbine's actual reactive power output, which may be adjusted or modified by the Q command signal 105 ($Q_{Cmd}$) indicative of desired reactive power output at the generator.

The Q balance regulator 220 functions to create a delta voltage trim value or signal ($dV_{trim}$) 208 to add to the farm-level voltage command signal ($V_{wtg\ cmd}$) 155 to yield an adjusted command voltage signal ($V_{Adj\ cmd}$) 210, which is essentially the setpoint voltage for downstream voltage regulator 270. The signal $dV_{trim}$ 208 is maintained with set limits $dV_{max}$ 204 and $dV_{min}$ 206. Thus, the farm-level voltage command signal $V_{wtg\ cmd}$ 155, which is the basis for the voltage setpoint for downstream voltage regulator 270, is modified or adjusted by the Q balance regulator 220.

The Q balance regulator 220 functions to minimize the difference between the respective wind turbine's reactive output and the average reactive output $Q_{Avg}$ 200. In one embodiment, the Q balance regulator 220 is a proportional integral (PI) controller with a relatively slow response time, for example on the order of from 1 to 10 seconds (e.g., 3 seconds, 5 seconds, 5.5 seconds). It should be understood that other types of controllers and time constants may be used, for example, proportional derivative (PD) controllers, proportional integral derivative (PID) controllers, state space controllers, etc. Other time constants can be used for Q balance regulator 220 provided that the time constant for Q regulator 220 is numerically greater than the time constant for voltage regulator 270.

The adjusted command voltage signal $V_{Adj\ cmd}$ 210 is transmitted to a limiter circuit 240, which serves to maintain the signal value within defined limits and generate a set point voltage command signal $V_{command}$ 250 that indicates to a generator the reactive power to be provided by the generator $V_{command}$ 250 is limited by limiter 240 to a predetermined range between $V_{max}$ 242 and $V_{min}$ 244. In one embodiment, $V_{max}$ 242 and $V_{min}$ 244 are defined in terms of percentage of rated generator output. For example, $V_{max}$ 242 can be 105% of rated generator voltage and $V_{min}$ 244 can be 95% of rated generator voltage. Alternate limits can also be used.

In certain embodiments, $V_{command}$ 250 is compared to a signal 255 indicating measured terminal voltage for the generator. The difference between $V_{command}$ 250 and measured terminal voltage 255 is a voltage error signal 260 ($V_{Error}$), which is reduced by the voltage regulator 270 to cause the measured voltage to follow the voltage command.

Based on voltage error signal 260 ($V_{Error}$), the voltage regulator 270 generates reactive current command 280 ($I_{rq\ Cmd}$), which is used to control generator current. In one embodiment, Voltage regulator 270 is a PI controller that has a closed-loop time constant of approximately 50 milliseconds. Other types of controllers can also be used, for example, PD controllers, PID controllers, etc. Other time constants can be used (e.g., 1 second, 20 milliseconds, 75 milliseconds, 45 milliseconds) for voltage regulator 270 provided that the time constant for voltage regulator 270 is less than the time constant for Q balance regulator 220.

In general, there are two components of a generator current command They are the real power component denoted as $I_{d\ cmd}$ and the reactive power component denoted as $I_{q\ cmd}$. The current command 280 generated as described with respect to FIG. 2 is the reactive component ($I_{rq\ Cmd}$) of the current command. The real component or $I_{d\ Cmd}$ can be generated in any manner known in the art. Reactive current command 280 is limited to $I_{q\ max}$ 272 and $I_{q\ min}$ 274. The values for $I_{q\ max}$ 272 and $I_{q\ min}$ 274 can be based on generator current ratings. For example, $I_{q\ max}$ 272 can be set to a percentage of rated current for the generator and $I_{q\ min}$ 274 can be set to $-I_{q\ max}$. Alternate limits can also be used.

The current command 280 is transmitted to a controller of the wind turbine generator for generating real and reactive power based on the current commands. In one embodiment, all of the limits discussed with respect to FIG. 2 are non-windup limits; however, in alternate embodiments, a subset of the limits can be non-windup limits. The limits have been discussed in terms of fixed parameters; however, dynamically variable parameters provided by, for example, a lookup table or a processor or state machine executing a control algorithm can provide the limits. Such a dynamically variable limit may be based upon a current rating of the generator and a contemporaneous real power output.

Figure 3:
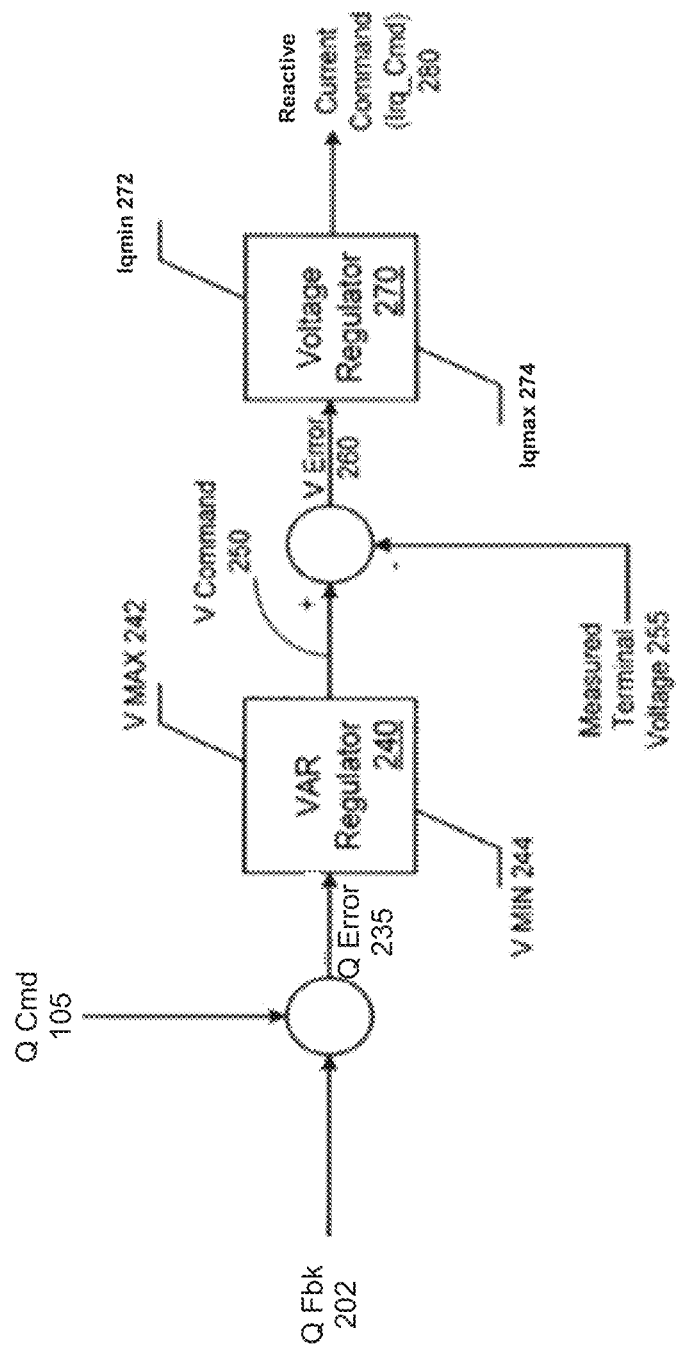
FIG. 3 is a control diagram of an alternate embodiment of a wind turbine generator control system in manual or local control.

As mentioned above, the local or Operator Q command signal ($Q_{Cmd}$) 105 indicating desired reactive power at the generator terminals may be supplied to the local controller 110 in the event that the wind turbine generator is in manual mode or otherwise not in communication with the wind farm controller 150. In this mode, the control system will function as depicted in FIG. 3. In this embodiment, the $Q_{Cmd}$ signal 105 is combined with the $Q_{Fbk}$ signal 202 to produce a $Q_{Error}$ signal 235 that is supplied to a VAR (Q) regulator 240. The regulator 240 generates the limited $V_{command}$ 250 that is compared to a measured terminal voltage signal 255 to generate the voltage error signal 260 ($V_{Error}$) input to the voltage regulator 270, as discussed in detail above.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In addition, while the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for reactive power generation for a wind turbine generator, comprising:
    averaging measured reactive current for all or a subset of wind turbines within a wind farm or substation to generate a field-level average reactive power output signal;
    receiving a voltage command signal, the field-level average reactive power output signal, and the wind turbine's actual reactive power;
    generating a voltage trim value as a function of the field-level average reactive power output signal and the wind turbine's actual reactive power;
    adjusting the voltage command signal as a function of the voltage trim value;
    determining a reactive current command for the wind turbine generator in response to the adjusted voltage command signal; and
    transmitting the reactive current command to a controller of the wind turbine generator and generating a reactive power based on the reactive current command.

2. The method as in claim 1, wherein the adjusted voltage command signal is limited to a range of upper and lower limits based on generator terminal voltage, and the reactive current command is limited to a range based on a current rating of the wind turbine generator.

3. The method as in claim 2, wherein the adjusted voltage command signal is compared to a measured terminal voltage of the wind turbine generator to generate an error voltage signal transmitted to a voltage regulator.

4. The method as in claim 1, wherein the voltage command signal is a farm-level command signal applicable to all or a subset of wind turbines within a wind farm.

5. The method as in claim 1, wherein the field-level average reactive power output signal output is generated by a field-level controller that receives the measured reactive current from all or a subset of wind turbines and computes the field-level average reactive power output signal.

6. The method as in claim 1, wherein the field-level average reactive power output signal output is generated by a field-level controller that senses total reactive power at the field-level and computes an estimated average reactive power output for the wind turbines.

7. The method as in claim 1, wherein a reactive power feedback signal from the wind turbine generator and the reference reactive power signal are transmitted to a reactive power regulator for generation of the voltage trim value.

8. The method as in claim 7, wherein the voltage trim value is limited by the reactive power regulator.

* * * * *